United States Patent
Sayhoun et al.

(10) Patent No.: US 7,954,617 B2
(45) Date of Patent: Jun. 7, 2011

(54) MOTORCYCLE CLUTCH

(75) Inventors: Ahmed Sayhoun, Weilheim (DE); Falk Nickel, Fuchstal (DE); Georg Ruprecht, Biessenhofen (DE)

(73) Assignee: Hoerbiger Antriebstechnik GmbH, Schongau (DE)

( * ) Notice: Subject to any disclaimer, the term of this patent is extended or adjusted under 35 U.S.C. 154(b) by 677 days.

(21) Appl. No.: 12/026,351

(22) Filed: Feb. 5, 2008

(65) Prior Publication Data

US 2008/0223688 A1    Sep. 18, 2008

(30) Foreign Application Priority Data

Feb. 5, 2007 (EP) .................................. 07002438

(51) Int. Cl.
*F16D 25/04* (2006.01)
*F16D 25/08* (2006.01)
(52) U.S. Cl. .................... 192/83; 192/85.15; 192/85.57; 192/85.58
(58) Field of Classification Search ............... 192/85.15, 192/85.5, 85.58
See application file for complete search history.

(56) References Cited

U.S. PATENT DOCUMENTS

| 4,858,716 A | * | 8/1989 | Kano et al. ................. 192/85.15 |
| 5,860,892 A | | 1/1999 | Korenjak et al. |
| 6,604,451 B1 | * | 8/2003 | Yasuda ............................ 92/48 |

FOREIGN PATENT DOCUMENTS

| EP | 0 098 749 | 1/1984 |
| EP | 0 780 591 | 6/1997 |
| GB | 981 913 | 1/1965 |
| GB | 2 247 292 | 2/1992 |

* cited by examiner

*Primary Examiner* — Rodney H Bonck
(74) *Attorney, Agent, or Firm* — Tarolli, Sundheim, Covell & Tummino LLP

(57) ABSTRACT

A motorcycle clutch for a drive connection between an engine and a transmission of a motorcycle is provided, and is some embodiments includes a manually operable clutch lever, engaging inner and outer disks, and a disengaging mechanism operable by means of the clutch lever for a pressure body which is spring-loaded by at least one clutch spring assembly for pressurization of the inner and outer disks, wherein a servo mechanism for reducing the operating force of the clutch lever is provided, the servo mechanism being effectively connected to the intake section of the engine and utilizing the negative intake pressure in the intake section to build up a servo force acting against the direction of the spring load of the clutch spring assembly.

15 Claims, 2 Drawing Sheets

MOTORCYCLE CLUTCH

BACKGROUND

The invention relates to a motorcycle clutch for a drive connection between an engine and a transmission of a motorcycle.

Such a clutch is known from EP 0 780 591 B1. In this document, problems which may occur in motorcycles are described. In particular, in types of higher performance motorcycles, in the partial load range and during motor braking, the clutch, upon decreasing engine torque, increasingly becomes a rigid drive connection between the engine and the driven rear wheel, with the consequence that the rear wheel tends to swerve or jump.

Further, it is described that, for decreasing the shifting forces of a clutch for a motorcycle, EP 0 098 749 A1 teaches to configure a clutch spring to engage the clutch only for part of the largest transferable torque, and to apply the remaining clutch force hydraulically. In this known clutch, it is considered to be disadvantageous for the function of the drag torque (to which EP 0 780 591 B1 is directed) that the smallest transferable torque is determined by the clutch spring which must be sufficiently dimensioned for driving the crankshaft through the rear wheel. Further, it is explained that, in this known clutch, no sensitive control of the admission pressure of the clutch is possible, since the hydraulic pressure is substantially relieved upon actuating the shift valve.

In order to configure a clutch for a motorcycle, such that the torque transmission between the engine and the driven rear wheel in a predetermined range enables an advantageous compensation of possible drive side irregularities during motor braking, independent of the closing force of the clutch spring, EP 0 780 591 B1 teaches the provision of a controller with which it should be possible to admit the pressure body of the clutch with a force opposite to the closing force of the clutch spring in accordance with the engine load.

However, this embodiment of a motorcycle clutch is disadvantageous in view of the fact that large operating forces of the clutch lever of motorcycle clutches may still be present due to the limitations of the installation space, since, in particular, in motorcycles having a large cylinder capacity, very large clutch spring forces have to be applied for transmitting the engine torque. These forces have to be overcome manually when disengaging the clutch, which in turn results in large operating forces.

SUMMARY

It is therefore desirable to provide a motorcycle clutch which enables a considerable decrease of the operating forces for the manually operable clutch lever of the clutch.

Contrary to the teachings of EP 0 780 591 B1, the present invention provides a motorcycle clutch being equipped with a servo mechanism enabling reduction of the operating force of the clutch lever to a selectable amount that is optimal for the driver, for starting as well as in any possible shifting process. Tests carried out within the scope of the present invention have proven that upon focusing on the problems which could occur at negative engine torques according to EP 0 780 591 B1, the problem being more relevant in practice remains unsolved (i.e., that the operating force of the clutch lever may not be reduced to such an extent that an operation of the clutch is permanently possible in accordance with today's requirements of convenience and security). Therefore, turning away from the teachings of EP 0 780 591 B1, the present invention provides a servo mechanism which utilizes the intake pressure in the intake section of the engine to build up a force during any shifting process (i.e. for starting as well as during any other shifting process). The force counteracts the load of the clutch spring assembly, such that a reduction of the operation force of the clutch lever is enabled during all operating states.

In particular, it is possible to provide the servo mechanism with an assembly of at least two or more diaphragms which may either be connected in series or may also be arranged in opposite effective directions, wherein alignment of the diaphragm forces may be achieved (e.g., mechanically or hydraulically) by a switching device. The diaphragm forces may be added to form a counter-force, which effectively reduces the operating force during all operating states.

A very large uncoupling of the drive train can be obtained in connection with the increasing negative pressure during motor braking, which may possibly be used in an advantageous manner to inhibit the influence of negative torque on road performance. In case it is desired to use the negative torque, such as when driving downhill, a negative pressure limitation device is provided in some embodiments. This device is provided between the source of the negative pressure (the suction pipe of the engine) and the clutch. With this device, the transferable negative drive torque may be determined in an advantageous manner for the road performance in a very large range.

During motor braking of the motorcycle, the negative pressure in the intake section of the engine strongly increases, thereby causing a spring-biased diaphragm piston to act against the atmosphere in this embodiment, such that the diaphragm piston closes a switching point between the engine and the clutch. Consequently, a maximum negative pressure beyond this switching point towards the clutch is limited or determined, such that the transmission of a drag torque of the engine is possible, since the clutch is somewhat released, but is not opened completely. This makes it possible to also achieve a motor braking when using a clutch according to the present invention, without the danger of swerving of the rear wheel.

When the negative pressure decreases upon stepping on the gas again, the switching point is opened such that the connection toward the servo mechanism is released again.

According to some embodiments of the invention, it is herein possible to provide the aforementioned diaphragm piston as a passive member, or to provide an actively controlled switching member (e.g. an electronic switching member) instead of the diaphragm piston, which may be controlled in accordance with selectable engine parameters.

In these embodiments, it is additionally possible to provide an additional negative pressure storage (accumulator) which may be switched on behind the switching point toward the clutch, which makes it possible to provide negative pressure to the clutch (e.g., when the engine is stopped) such that, also under this condition, a servo effect for reducing the manual operating force of the clutch lever is feasible, such as for shunting. For this purpose, the accumulator can be charged through a check valve during driving, to enable the desired reduction of manual force during shunting by switching onto the servo cylinder upon simultaneous closing of the switching point to the engine.

Other aspects of the present invention will become apparent by consideration of the detailed description and accompanying drawings.

DETAILED DESCRIPTION

Figure 1:
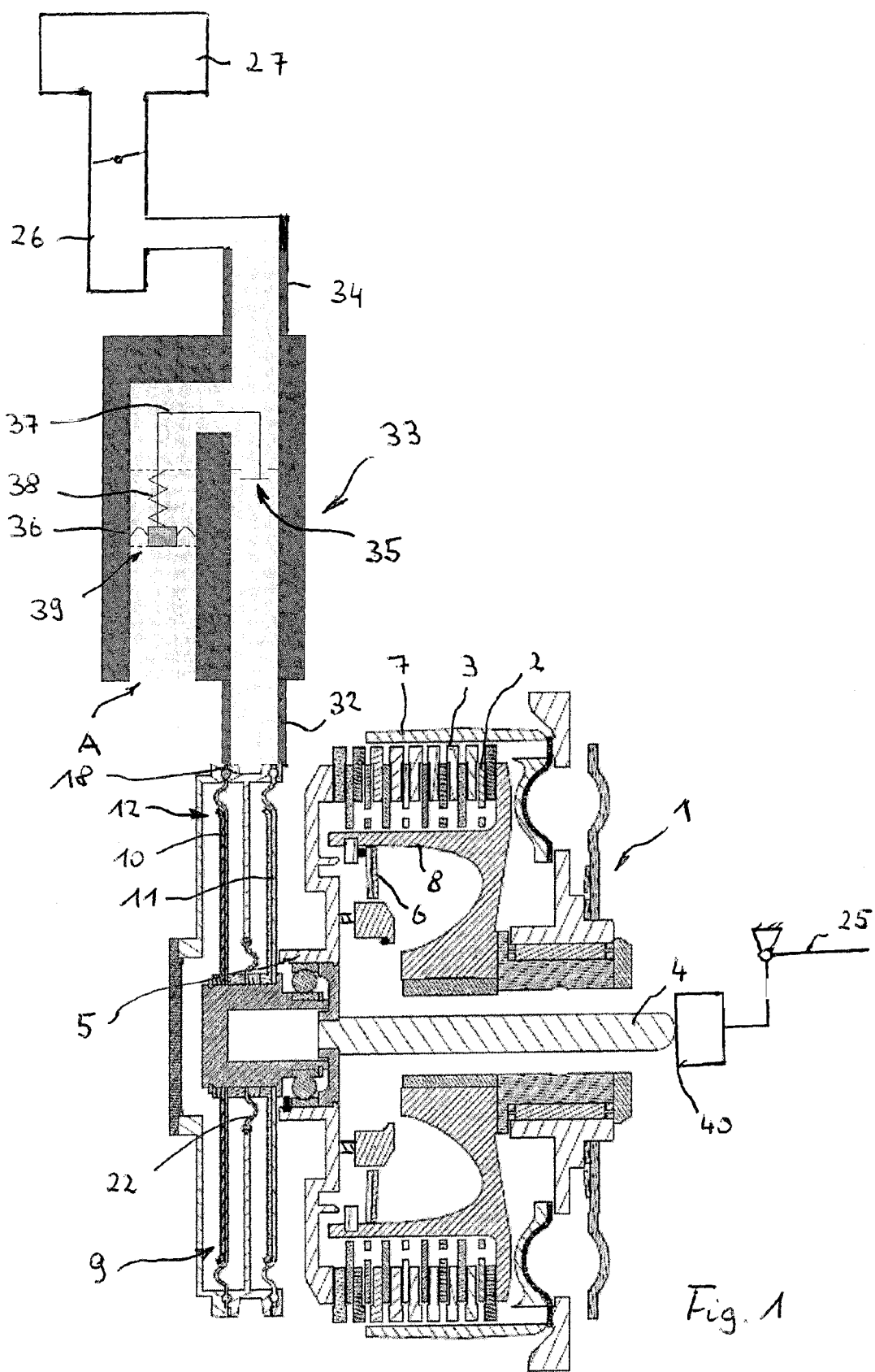
FIG. 1 is a sectional view of a clutch in a schematically simplified block diagram.

In FIG. 1, a clutch 1 (such as for a motorcycle) is shown, which is embodied as a multi-disk clutch and accordingly comprises engaging inner and outer disks 2 and 3. The outer disks 3 are disposed in a cage 7 and the inner disks 2 are arranged on a hub 8, as shown in detail in FIG. 1, wherein an external clutch housing is not shown.

Further, the clutch 1 comprises a disengaging mechanism 4 for a pressure body 5. The pressure body 5 is spring-loaded in the closing or engaging direction of the clutch 1 by at least one clutch spring assembly 6.

The clutch 1 further comprises a servo mechanism 9. The servo mechanism 9 serves to reduce the operating force of a clutch lever 25 (shown schematically in FIG. 1) of a motorcycle not shown in detail in the figures. The illustrated servo mechanism 9 is connected to an intake section 26 of an engine 27 (shown schematically in FIG. 1) of the motorcycle, such that the servo mechanism 9 may utilize the negative intake pressure present in the intake section 26 to build up a servo force. This servo force counter-acts the direction of the spring load of the spring assembly 6, thus reducing the operating force for the clutch lever 25. The clutch lever 25 is pulled against the spring load acting on the disks 2 and 3 in order to disengage the clutch 1 (i.e., to separate the inner and outer disks 2 and 3, respectively). A pressure medium cylinder 40 can be included between the clutch lever 25 and the disengaging mechanism 4, as shown in FIG. 1.

Figure 2:
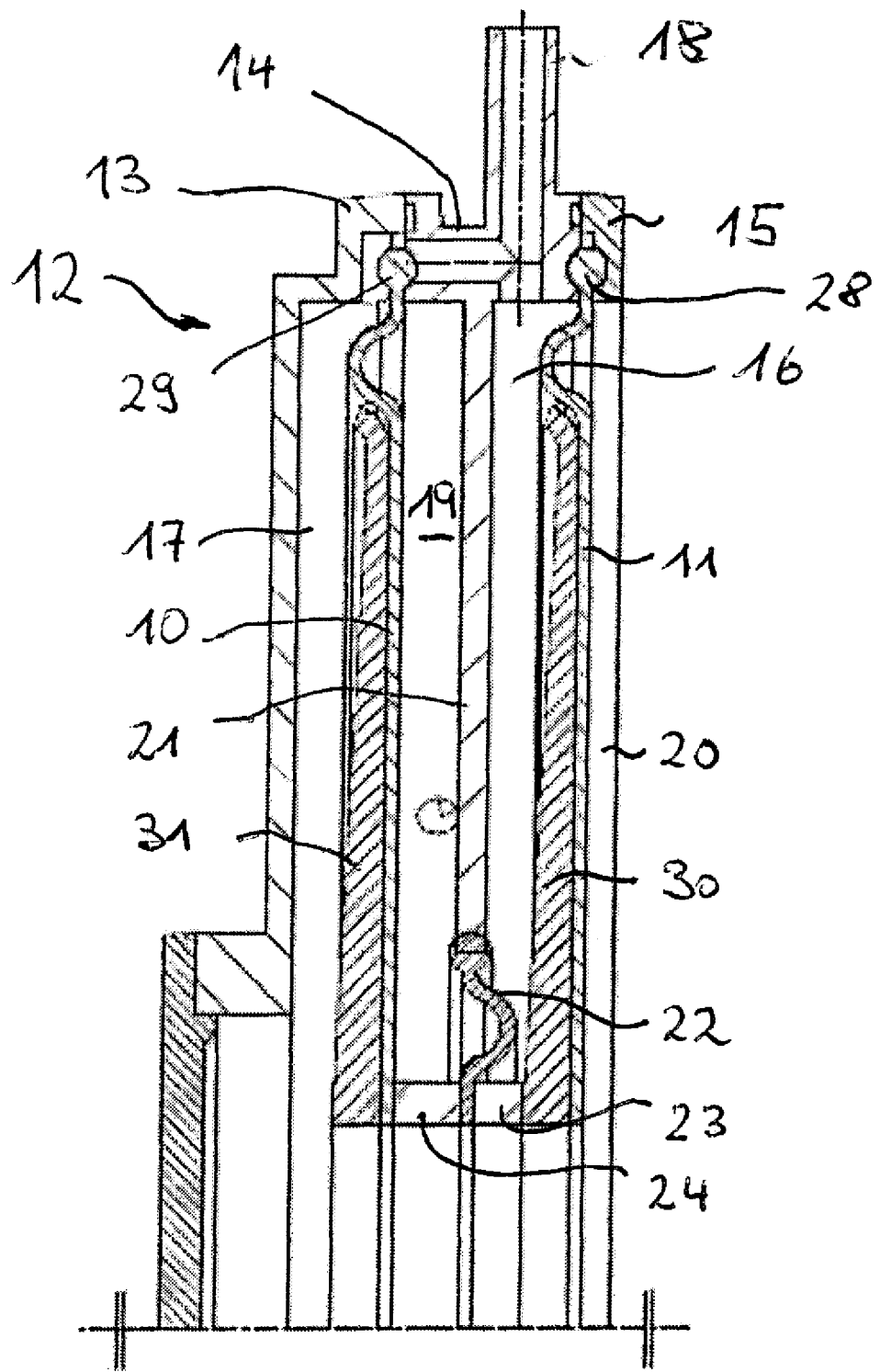
FIG. 2 is a sectional view of a diaphragm assembly of the servo mechanism of the clutch.

In the embodiment shown in FIGS. 1 and 2, the servo mechanism 9 comprises a diaphragm assembly which, in this example, comprises two diaphragms 10 and 11 arranged in series in a housing 12. The housing 12 comprises an external portion 13, an intermediate portion 14 and an internal portion 15, shown in the partial sectional view of FIG. 2. The portions 13, 14 and 15 are coupled to each other, and in some embodiments are fixedly coupled to each other. The portions 13, 14 and 15 at least partially enclose negative pressure rooms 16 and 17 (i.e. chambers) which are separated from atmosphere pressure rooms 19 and 20 (i.e. chambers) by the diaphragms 10 and 11. For this purpose, the diaphragms 10 and 11 are clamped in the housing 12 via sealing mechanisms 28 and 29 at their outer circumferential portions. A lower diaphragm seal 22, such as the seal 22 illustrated in FIG. 2, is provided to seal the housing toward the clutch shaft. In some embodiments, the diaphragm seal 22 is attached at an intermediate wall 21 and secured between distance sleeves 23 and 24 (i.e. spacer disks) which are supported at wall portions 30 and 31 of the housing 12.

In the illustrated embodiment, the negative pressure chambers 16 and 17 are connected to the intake section 26 of the engine 27 via a negative pressure port 18 and a negative pressure line 32.

A negative pressure limitation device 33 (shown schematically in FIG. 1) is interconnected between the intake section 26 and the negative pressure port 18. The negative pressure limitation device 33 is connected to the intake section 26, which merges into the negative pressure line via a connecting line 34.

In the connecting line 34, within the negative pressure limitation device 33, a switching point 35 is provided, e.g. in the form of a valve, which is connected through a connector 37 to an actuator, in this example a diaphragm piston 36. The diaphragm piston 36 is biased by a spring 38 against a positive stop 39. Upon occurrence of a negative pressure in the intake section 26 during motor braking, when this negative pressure increases strongly, the spring-loaded diaphragm piston closes the switching point 35, since the diaphragm piston acts against the atmosphere A. Consequently, the negative pressure is limited to or retained at its maximum value in the region behind the switching point 35, i.e. toward the negative pressure port 18. Therefore, the transmission of a drag torque of the engine is possible, since the clutch 1 opens only partially, but not completely. This makes it possible to utilize the braking effect of the engine.

When the negative pressure decreases again (i.e. when stepping on the gas) the switching point 35 is opened such that the connection to the servo mechanism 9 is re-established.

In addition to the aforementioned written disclosure, reference is made to the graphical depiction of the invention in FIGS. 1 and 2, since other parts of the inventive clutch 1, as its connection to the engine (e.g. by a gear assembly) have not been explained in detail, because those parts are not required for the explanation of the principles of the present invention.

Various features and advantages of the invention are set forth in the following claims.

What is claimed is:

1. A motorcycle clutch for a drive connection between an engine and a transmission of a motorcycle, comprising:
   a manually operable clutch lever;
   engaging inner and outer disks;
   disengaging mechanism operable by the clutch lever for a pressure body which is spring-loaded by at least one clutch spring assembly for pressurization of the inner and outer disks; and
   a servo mechanism for reducing the operating force of the clutch lever, the servo mechanism being coupled to an intake section of the engine and utilizing negative intake pressure in the intake section to build up a servo force acting against a direction of the spring load of the clutch spring assembly,
   a negative pressure limitation device positioned between the intake section and a negative pressure port of the servo mechanism,
   wherein the negative pressure limitation device comprises a switching point disposed between the intake section and the negative pressure port, and which is movable between open and closed positions by an actuator in accordance with negative pressure in the intake section.

2. The clutch of claim 1, wherein the servo mechanism comprises an assembly of at least two diaphragms.

3. The clutch of claim 2, wherein the diaphragms are connected in series.

4. The clutch of claim 3, wherein the diaphragms are included in a housing, at least one atmosphere chamber and one negative pressure chamber are located directly adjacent to each other and are uncoupled only by a displaceable seal.

5. The clutch of claim 3, wherein the diaphragms are included in a housing, wherein sealing of adjacently located atmosphere chambers and negative pressure chambers is provided by a further diaphragm.

6. The clutch of claim 2, wherein the diaphragms are clamped in a housing.

7. The clutch of claim 3, wherein the diaphragms are clamped in a housing.

8. The clutch of claim 1, wherein the negative pressure limitation device comprises an actuator having a spring-loaded diaphragm piston biased against a positive stop with respect to the atmosphere.

9. A motorcycle clutch for a drive connection between an engine and a transmission of a motorcycle, comprising:
   a manually operable clutch lever;

engaging inner and outer disks;

disengaging mechanism operable by the clutch lever for a pressure body which is spring-loaded by at least one clutch spring assembly for pressurization of the inner and outer disks;

a servo mechanism for reducing the operating force of the clutch lever, the servo mechanism being coupled to an intake section of the engine and utilizing negative intake pressure in the intake section to build up a servo force acting against a direction of the spring load of the clutch spring assembly, and a negative pressure limitation device positioned between the intake section and a negative pressure port of the servo mechanism wherein the negative pressure limitation device comprises an actuator having a spring-loaded diaphragm piston biased against a positive stop with respect to the atmosphere.

10. The clutch of claim 9, wherein the servo mechanism comprises an assembly of at least two diaphragms.

11. The clutch of claim 10, wherein the diaphragms are connected in series.

12. The clutch of claim 11, wherein the diaphragms are included in a housing, at least one atmosphere chamber and one negative pressure chamber are located directly adjacent to each other and are uncoupled only by a displaceable seal.

13. The clutch of claim 11, wherein the diaphragms are included in a housing, wherein sealing of adjacently located atmosphere chambers and negative pressure chambers is provided by a further diaphragm.

14. The clutch of claim 10, wherein the diaphragms are clamped in a housing.

15. The clutch of claim 11, wherein the diaphragms are clamped in a housing.

\* \* \* \* \*